Sept. 12, 1961 C. H. HEUER ET AL 2,999,897
LUMINANCE AMPLIFIER
Filed May 28, 1958
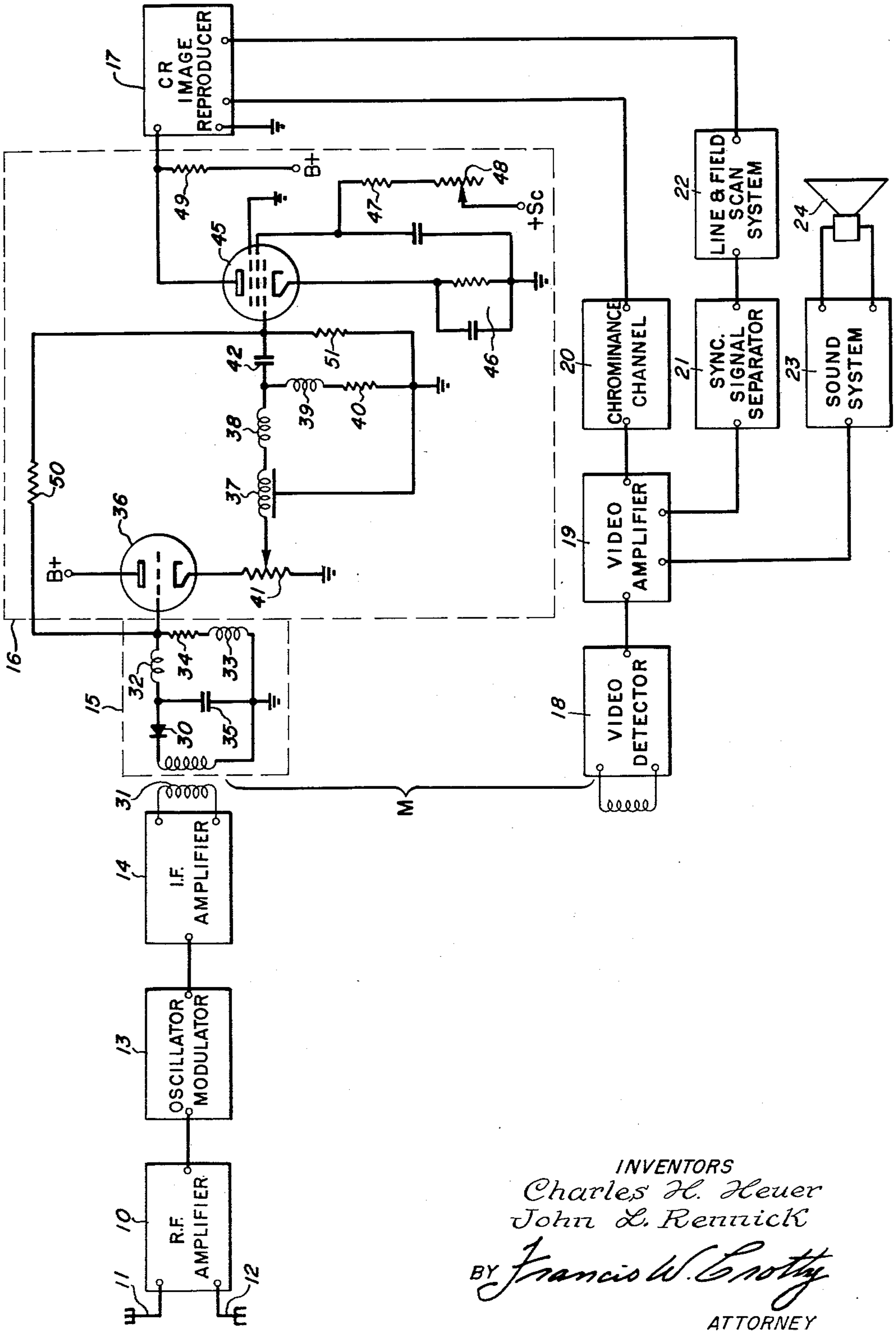
INVENTORS
Charles H. Heuer
John L. Rennick
BY Francis W. Crotty
ATTORNEY United States Patent Office 2,999,897
Patented Sept. 12, 1961

2,999,897
LUMINANCE AMPLIFIER

Charles H. Heuer, Glencoe, and John L. Rennick, Elmwood Park, Ill., assignors to Zenith Radio Corporation, a corporation of Delaware Filed May 28, 1958, Ser. No. 738,372
6 Claims. (Cl. 178—5.4)

The present invention concerns a television receiver and is particularly directed to the luminance channel of such receivers, especially those designed to reproduce images in simulated natural color.

Color television receivers constructed to utilize color television broadcasts emanating under the authority of the Federal Communications Commission are designed with a view to effect efficient translation of signals conforming to the specifications prescribed by that commission. For present purposes, it is sufficient to regard the transmission, at least so far as the video program is concerned, as having two related signals, respectively representing the luminance and chromaticity of the televised image. The luminance signal conveys brightness information and is the signal component which permits present-day systems to be compatible in that this component may be utilized in monochrome receivers to produce a black-and-white image in response to a color telecast. The chrominance signal information conveys the color aspects of the image and is transmitted in the form of color control signals having a bandwith substantially less than that of the luminance signal.

Customarily, the colorcast has two such color control signals although three are necessary completely to determine the color information of an image reproduced in a system employing the principles of three additive primary colors. The derivation of the two transmitted color control signals is such that their combination at the receiver yields the necessary third signal for application to a three-gun type of color image-producing device. However, it is found that the translation of the chrominance information at the receiver introduces a finite delay of color information with respect to brightness information. This results from the fact that several narrow bandwidth operations are performed on the received signal in deriving the necessary three color-control signals for application to the three-gun color image reproducer. The time delay introduced is manifest in an inappropriate phase relation of the luminance and chrominance information as applied to the image reproducer unless that delay is compensated in one way or another.

It is immediately apparent that compensation may be achieved by including a video delay network in the luminance channel, selected to introduce a time delay commensurate with that to which the chrominance information is subjected in the chrominance channel. This has been proposed and has been practiced in the art but prior arrangements have not been entirely satisfactory.

For example, it has been proposed that a video delay line be interposed in the luminance channel between the video detector and the video amplifier but the impedance relations presented do not yield optimum results. A diode detector performs most satisfactorily into a load circuit of fairly high impedance but a video delay line of high characteristic impedance has an unsatisfactory frequency response over the video frequency band. On the other hand, were the delay line constructed to have a relatively low characteristic impedance so that its frequency response is improved over the video range, it no longer represents an appropriate load for the detector.

Accordingly, it is an object of the present invention to provide an improved luminance channel for a color television receiver for optimizing image reproduction in spite of a time delay experienced in the translation of the chrominance information through the chrominance channel of the receiver.

It is a specific object of the invention to provide for a color television receiver an improved and economical luminance channel characterized by the inclusion of the video time-delay network which compensates the delay of signal translation in the chrominance channel and at the same time attains satisfactory impedance relations and frequency response throughout the luminance channel.

It is a general object of the invention to provide an improved luminance channel for television receivers.

A luminance channel, in accordance with one aspect of the invention, is especially suited for inclusion in a color television receiver having a chrominance channel which introduces a time delay of a predetermined amount in the translation of chrominance information. The arrangement comprises a video detector means for developing luminance signal energy and a cathode follower coupled to the detector and having a load impedance including a time-delay network which exhibits a delay substantially equal to that experienced in the chrominance channel. There is a video amplifier plus means, including an alternating-current (A.C.) coupling impedance, for coupling the delay network to that amplifier in order to apply a luminance signal thereto. Finally, there is a direct-current (D.C.) connecting means between the video detector and the video amplifier in order to restore at that amplifier at least a portion of the direct current component of the luminance signal which is otherwise lost due to the A.C. coupling. The D.C. connecting means has a transmission to A.C. components of the luminance signal which is substantially less than that of the coupling means coupling the time-delay network to the video amplifier.

The features of the present invention which are believed to be novel are set forth with particularity in the appended claims. The organization and manner of operation of the invention, together with further objects and advantages thereof, may best be understood by reference to the following description taken in connection with the accompanying drawing, the single figure of which represents schematically a color television receiver including a luminance channel embodying the subject invention.

The receiver comprises a radio-frequency amplifier 10 of any desired number of stages having input terminals connected to an antenna system 11, 12. Connected in cascade to amplifier 10 are an oscillator modulator 13, an intermediate-frequency amplifier 14, a first video detector included within a broken-line rectangle 15, a cathode follower and video amplifier included within a broken-line rectangle 16 and an image reproducer 17 of the cathode-ray type. The image reproducer may take the form of the so-called "shadow mask" tube having an electrode system for developing, focusing and accelerating three electron beams to an image-reproducing screen area bearing a multiplicity of triads, each of which has a component issuing light radiation in one of the three primary colors, red, blue and green. An apertured plate interposed between the beam sources and the screen area constitutes a vehicle by which each beam effectively sees only that element of each triad which it is intended to excite.

Coupled to I.-F. amplifier 14, as indicated by the bracket M, is a second video detector 18 to which is coupled a further video amplifier 19. This amplifier is coupled to the chrominance channel 20 which will be considered to include a chrominance amplifier, reference signal oscillator, as well as the usual demodulators responsive to the chrominance signal and locally generated reference oscillations for deriving color-control signals for application to image reproducer 17.

A synchronizing-signal separator 21 is also coupled to amplifier 19 to supply synchronizing signals to the control or synchronizing circuits of a conventional line and field scanning system 22. The output circuits of that system are likewise coupled to reproducer 17 for applying scanning or deflection signals to the scanning yoke associated with the reproducing device.

Finally, a sound system 23 is coupled to amplifier 19 to derive an intercarrier component representing the sound information of the colorcast. The sound system will be regarded as including the usual stages of audio detection and amplification coupled in driving relation to a sound transducer or loud speaker 24.

Neglecting for the moment the details of units 15 and 16, the described receiver will be recognized as of conventional design and construction so that it is not necessary to particularize as to the details of its remaining component parts. In operation, tuning of R.-F. amplifier 10 selects a desired color signal intercepted by antenna system 11, 12 which, after amplification, is applied to oscillator modulator 13. The oscillator of this unit is tuned concurrently with amplifier 10 to the end that modulator 13 supplies to amplifier 14 a signal of appropriate intermediate frequency. The intermediate-frequency signal, after detection in detector 15 and amplification in unit 16, is applied to the input circuit of image reproducer 17 to intensity modulate the three electron beams thereof. This may be thought of as the luminance signal and the channel comprising units 15 and 16 constitutes the luminance channel to be considered more particularly hereinafter.

The intermediate-frequency signal is concurrently detected in detector 18 and, after amplification in amplifier 19, the chrominance signal component thereof is selected for translation in chrominance channel 20. This selection is made on a frequency basis since the chrominance information is customarily conveyed as modulation of a subcarrier of known and precisely controlled frequency. Demodulation of that carrier within the chrominance channel results in the development at the receiver of the necessary color control signals for application to assigned ones of the three electron guns of reproducer 17 to introduce the gradations of the three primary colors used in the additive system in the synthesizing of the color image. At the same time, it is found from experience that this process of locally developing the necessary control signals, which is a narrow band process, introduces a time delay of a known or predetermined amount to the color or chrominance information at the image reproducer in comparison with the translation of the luminance signal where the luminance channel is not provided with means for introducing a corresponding time delay.

Concurrently with the translation of the luminance and chrominance signals, synchronizing-signal separator 21 extracts the line and field synchronizing components of the received signal properly to time the operation of scanning system 22 to the end that the line and field scansion of reproducer 17 is synchronized with the transmission. In this fashion, the three electron beams of reproducer 17 are concurrently modulated with video information and with chrominance information while sweeping or coursing a series of fields of parallel lines in the usual manner of tracing an image in color.

It is customary in today's practice to recognize that an intercarrier component is developed in video detector 18 and is available as an amplified component at the video amplifier. This is a 4½ megacycle signal frequency modulated with the sound information accompanying the video program and it is translated by sound system 23 to drive the loud speaker for the reproduction of the sound program. Generally, a receiver of the type under consideration also includes systems for controlling certain of its operating characteristics, such as gain of the R.-F. amplifier, oscillator modulator or intermediate-frequency amplifier and operating frequency of the reference signal oscillator. These control systems are well-known and have been omitted from the drawing for the sake of simplicity.

Referring now to the luminance channel of the receiver, the video detector 15 includes a diode 30 inductively coupled by means of a coupling transformer 31 to I.-F. amplifier 14. The load circuit of the diode comprises series and shunt peaking coils 32, 33 and a load resistor 34 and a small I.-F. by-pass condenser 35. This detector is coupled to a cathode follower of the triode type including a tube 36 having anode, cathode and control electrodes. The anode is directly coupled to a source of operating potential B+ and the control electrode connects to the junction of the series peaking coil 32 and diode load resistor 34. The load circuit of the cathode follower includes a time-delay network 37 shown symbolically. It is a video delay line, by which is meant a delay line that has a substantially uniform amplitude response over a major portion of the video frequency range and has a substantially linear phase shift-frequency characteristic so that the video information of the received signal is translated therethrough with no material amplitude or phase distortion. As indicated above, such a delay line is a relatively low impedance device having a characteristic impedance of the order of 1600 ohms. In order to avoid reflections which would destroy fidelity of reproduction, the delay line is properly terminated at one end, the termination being provided by a series inductor 38, a parallel branch including an inductor 39 and a resistor 40, as well as the distributed capacitances of the circuit. The length of line 37 in an electrical sense is determined to the end that the delay it introduces causes the signal translation time of the luminance channel to be substantially the same as that of the chrominance channel 20. The input terminals of the delay line are connected to a potentiometer 41 through which the cathode of tube 36 is connected to ground. This potentiometer serves the purposes of contrast control. The remote end of the line is coupled by means of an A.C. coupling impedance, specifically a coupling condenser 42, to the input circuit of the video amplifier including a pentode-type tube 45. The cathode of this tube is grounded through a self-biasing network 46 provided by a resistor by-passed in the usual way. The screen electrode is connected to a source of operating potential +*Sc* through a screen dropping resistor 47 and a potentiometer 48 which serves as a brightness control. The suppressor electrode is grounded and the anode connects to a source of operating potential B+ through a video load represented symbolically by resistor 49. This load is D.C. coupled to reproducer 17.

Finally, there is a D.C. connection extending from video detector 15 to the input circuit of video amplifier 45. This connection, impedance-wise, includes but a single resistor 50 and its value is proportioned with respect to the grid return resistor 51 of amplifier 45 to achieve the desired amount of direct-current restoration of the luminance signal at the input circuit of the amplifier.

The described luminance channel operates in essentially conventional fashion, translating the luminance signal from detector 15 through video amplifier 45 to image reproducer 17. However, time-delay network 37 introduces the time delay required so that the chrominance and luminance information are applied to the reproducer in proper time relation. Of course, the alternating-current coupling between the remote end of delay line 37 and the input electrode of tube 45 causes the direct-current component of the luminance signal to be lost. The direct-current connection afforded by resistor 50 from the video detector to the control electrode of the amplifier, in effect, restores or reinserts the lost D.C. component. Generally, the gain of the cathode follower is substantially less than unity and may, for example, be approximately 85%. Accordingly, it is desirable to adjust the relative values of resistors 50 and 51 so that the amount of D.C. restoration is commensurate with the gain of cathode follower 36. Alternatively, resistors 50 and 51 may be adjusted to achieve such other A.C. to D.C. ratio as may be desired.

So far as the A.C. component of the luminance signal is concerned, the impedance of the path including resistor 50 is very high with respect to that represented by cathode follower 36 and delay network 37. Therefore, the only significant A.C. component of the luminance signal applied to the input circuit of tube 45 is that which is translated through the delay network.

The need for coupling condenser 42 is apparent when it is recognized that there is a substantial potential drop in the cathode circuit of cathode follower 36 which, in the absence of the coupling condenser, tends to raise the potential of the grid of tube 45 with respect to its cathode. The circuit arrangement is facilitated and proper biases established particularly for the video amplifier through the use of the coupling condenser. At the same time the lost D.C. component is recovered through the simple expedient of a very inexpensive connection provided by the resistor 50 from the video detector to the video amplifier.

While the invention solves a distinct problem which is unique to color television receivers, it is also useful in monochrome receivers in which the video channel is the counterpart of the luminance channel of a color receiver. In a monochrome receiver, it is sometimes desirable to follow the video detector with a relatively low-gain video amplifier A.C. coupled to a final or output video amplifier, the first amplifier being so arranged or having an even number of stages so that there is, in effect, no phase reversal of the video signal as applied to the final amplifier. A D.C. connection of the type described hereinabove may then be employed, extending from the video detector, to restore any desired portion of the lost D.C. component of the video signal at the input of the final amplifier.

The described arrangement exhibits a satisfactory frequency response throughout the video range and has the further advantage that the diode detector operates into the desired high impedance load while, at the same time, the time-delay network may be simulated transmission line of low characteristic impedance consonant with realizing a desired frequency response characteristic. Additionally, D.C. restoration is effected in a most inexpensive manner, avoiding the need for any extra diode or tube devices for this purpose.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A luminance channel for a color television receiver having a chrominance channel which introduces a time delay of a predetermined amount in the translation of chrominance information, said luminance channel comprising: video detector means for developing luminance signal energy; a cathode follower coupled to said detector means and having a load impedance comprising a time-delay network exhibiting a time delay of substantially said predetermined amount; a video amplifier; means, including an A.C. coupling impedance, for coupling said time-delay network to said amplifier to apply a luminance signal thereto; and D.C. connecting means between said video detector means and said video amplifier, having a transmission to A.C. components of said luminance signal substantially less than that of said means coupling said network to said amplifier, for restoring at said amplifier at least part of the direct-current component of said luminance signal.

2. A luminance channel for a color television receiver having a chrominance channel which introduces a time delay of a predetermined amount in the translation of chrominance information, said luminance channel comprising: video detector means for developing luminance signal energy; a cathode follower coupled to said detector means having a load impedance comprising a time-delay network properly terminated at one end and exhibiting a time delay of substantially said predetermined amount; a video amplifier; means, including an A.C. coupling impedance, for coupling said one end of said time-delay network to said amplifier to apply a luminance signal thereto; and a D.C. connecting means between said video detector means and said video amplifier, having a transmission to A.C. components of said luminance signal substantially less than that of said means coupling said end of said network to said amplifier, for restoring at said amplifier a portion of the direct-current component of said luminance signal.

3. A luminance channel for a color television receiver having a chrominance channel which introduces a time delay of a predetermined amount in the translation of chrominance information, said luminance channel comprising: video detector means for developing luminance signal energy; a cathode follower coupled to said detector means having a load impedance comprising a contrast-control potentiometer and a time-delay network properly terminated at one end and exhibiting a time delay of substantially said predetermined amount; a video amplifier; means, including an A.C. coupling impedance, for coupling said one end of said time-delay network to said amplifier to apply a luminance signal thereto; and D.C. connecting means between said video detector means and said video amplifier, having a transmission to A.C. components of said luminance signal substantially less than that of said means coupling said end of said network to said amplifier for restoring at said amplifier at least a portion of the direct-current component of said luminance signal.

4. A luminance channel for a color television receiver having a chrominance channel which introduces a time delay of a predetermined amount in the translation of chrominance information, said luminance channel comprising: a video detector; a cathode follower coupled to said detector having a load impedance comprising a time-delay network exhibiting a time delay of substantially said predetermined amount; a video amplifier; means, including an A.C. coupling impedance, for coupling said time-delay network to said amplifier to apply a luminance signal thereto; and a D.C. connection from said video detector to said video amplifier, having an A.C. impedance high with respect to that of said time-delay network and said coupling impedance, for restoring at said amplifier at least a portion of the direct-current component of said luminance signal.

5. A luminance channel for a color television receiver having a chrominance channel which introduces a time-delay of a predetermined amount in the translation of chrominance information, said luminance channel comprising: a video detector; a cathode follower coupled to said detector having a load impedance comprising a time-delay network properly terminated at one end and exhibiting a time delay of substantially said predetermined amount; a video amplifier including an electric valve having cathode and control electrodes and having a first resistor coupled between said cathode and control electrodes; means, including a coupling condenser, for coupling said one end of said time-delay network to said control electrode of said amplifier across said resistor to apply a luminance signal thereto; and a second resistor connected between said detector and said control electrode of said video amplifier for restoring at said amplifier the direct-current component of said luminance signal, said second resistor having a value high relative to the characteristic impedance of said time-delay network and being proportioned relative to said first-mentioned resistor to attain a predetermined amount of direct-current restoration.

6. A luminance channel for a television receiver comprising: video detector means for developing luminance signal energy; a first video amplifier coupled to said detector means; a second video amplifier of substantially higher gain than that of said first anmplifier; means, including an A.C. coupling impedance, for cascade coupling said first amplifier to said second amplifier for applying a luminance signal thereto; and D.C. connecting means between said video detector means and said second amplifier, having a transmission to A.C. components of said luminance signal substantially less than that of said means coupling said first amplifier to said second amplifier, for restoring at said second amplifier at least a portion of the direct-current component of said luminance signal.

References Cited in the file of this patent

UNITED STATES PATENTS

| | | |
|---|---|---|
| 2,843,662 | Rieke | July 15, 1958 |